US008531837B2

(12) United States Patent
Lee et al.

(10) Patent No.: US 8,531,837 B2
(45) Date of Patent: Sep. 10, 2013

(54) PAD MECHANISM CAPABLE OF ADJUSTING HEIGHT THEREOF AND ELECTRONIC DEVICE THEREWITH

(75) Inventors: Jia-Hung Lee, New Taipei (TW); Chien-Heng Kuo, New Taipei (TW); Yen-Chang Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 164 days.

(21) Appl. No.: 13/330,621

(22) Filed: Dec. 19, 2011

(65) Prior Publication Data
US 2013/0010448 A1 Jan. 10, 2013

(30) Foreign Application Priority Data
Jul. 6, 2011 (TW) .............................. 100123833 A (51) Int. Cl.
*H05K 5/00* (2006.01)
(52) U.S. Cl.
USPC ................. 361/679.59; 361/679.2; 361/758; 361/804; 174/138 E; 174/138 G
(58) Field of Classification Search
USPC ......... 361/807, 808, 809, 810, 679.2, 679.11, 361/679.12, 679.44, 679.59, 732, 801, 802, 361/804, 730, 736, 742, 747, 758, 759, 760, 361/770, 791; 248/188.2, 188.3, 188.9, 188.8, 248/188.4; 312/334.4; 441/119–120
See application file for complete search history.

(56) References Cited

U.S. PATENT DOCUMENTS

| 6,407,351 | B1 * | 6/2002 | Meyer et al. .................. 177/238 |
| 6,429,380 | B1 * | 8/2002 | Lee et al. .................. 174/138 G |
| 6,892,991 | B1 * | 5/2005 | Soh ............................. 248/188.2 |
| 7,118,081 | B2 * | 10/2006 | Smith et al. ................ 248/188.2 |
| 7,715,190 | B2 * | 5/2010 | Tang ........................ 361/679.55 |
| 7,898,802 | B2 * | 3/2011 | Lian ........................ 361/679.59 |
| 7,959,117 | B2 * | 6/2011 | Chiu .......................... 248/188.1 |
| 8,213,177 | B2 * | 7/2012 | Uttermann et al. ....... 361/679.59 |
| 8,264,839 | B2 * | 9/2012 | Shen et al. ................ 361/679.59 |
| 2008/0239682 | A1 * | 10/2008 | Oooka ......................... 361/752 |
| 2008/0251663 | A1 * | 10/2008 | Tracy et al. ................ 248/188.8 |
| 2011/0042118 | A1 * | 2/2011 | Fan ................................ 174/50 |
| 2011/0222233 | A1 * | 9/2011 | Lu et al. .................... 361/679.21 |

* cited by examiner

*Primary Examiner* — Hoa C Nguyen
*Assistant Examiner* — Christopher L Augustin
(74) *Attorney, Agent, or Firm* — Winston Hsu; Scott Margo (57) ABSTRACT

A pad mechanism includes a step fixing structure having a plurality of step platforms. A height difference is formed between the two step platforms. A first engaging portion is formed on each step platform. The pad mechanism further includes a pad component having a pad body, a sleeve and a constraining portion. A second engaging portion is formed on the pad body for selectively engaging with the corresponding first engaging portion so as to adjust a height of the pad body protruding from the step fixing structure. The pad mechanism further includes a resilient component sheathing with the sleeve for driving the sleeve, and a constraining component installed on a side of the resilient component and connected to the constraining portion so as to prevent the resilient component from separating from the sleeve.

16 Claims, 7 Drawing Sheets

PAD MECHANISM CAPABLE OF ADJUSTING HEIGHT THEREOF AND ELECTRONIC DEVICE THEREWITH

BACKGROUND OF THE INVENTION

1. Field of the Invention

The present invention relates to a pad mechanism and an electronic device therewith, and more particularly, to a pad mechanism capable of adjusting height thereof and an electronic device therewith.

2. Description of the Prior Art

Since portable electronic devices are getting popular recently, portable electronic devices increasingly change in practicality and functionality. Appearance of the portable electronic devices is progressed to thin and aesthetic to meet the customer's demands. In aspect of mechanical design of the portable electronic devices, a pad disposed on a bottom of the portable electronic device is for boosting the portable electronic device to prevent the bottom of the portable electronic device from wearing, and to enlarge a gap between the portable electronic device and a supporting surface so as to improve convection under the portable electronic device, such that heat-dissipating efficiency of the portable electronic device is enhanced. Furthermore, the pad mechanism can adjust a tilting angle of a keyboard of the portable electronic device and increase a height of a display to reduce loading of a user's shoulders and neck while typing, so as to conform to the ergonomic design, such that the user can operate the notebook computer comfortably. Conventional pad mechanisms are mainly divided into two categories. One category is to attach a pad component to a bottom of a host of the portable electronic device. The drawback of the above-mentioned manner is that a height thereof is not adjustable. Assembly tolerances when assembling the pad component and the portable electronic device or wearing after the pad component has been used for a period will cause the portable electronic device to tilt when it is placed on the supporting surface. Or even when the portable electronic device is placed on an uneven supporting surface, it is necessary to use an auxiliary for boosting a housing of the portable electronic device to an appropriate height. The other category is to install the pad mechanism onto a supporting mechanism capable of adjusting height thereof so as to adjust the height of the pad mechanism according to the customer's demands. However, there are lots of mechanisms, such as a screw adjusting mechanism, a magnetic mechanism, a gear adjusting mechanism and so on, applied for the conventional supporting mechanism, such that the above-mentioned mechanisms with large volume occupy mechanical space and cause inconvenience for the user to carry. Accordingly, it is hard for the above-mentioned mechanisms to be fit in the portable electronic devices with a trend to thinness and aesthetic.

SUMMARY OF THE INVENTION

Thus, the present invention provides a pad mechanism capable of adjusting height thereof and an electronic device therewith for solving above drawbacks.

According to the claimed invention, a pad mechanism includes a step fixing structure. The step fixing structure includes a plurality of step platforms surrounding to a hole with a height difference formed between two step platforms of the plurality of step platforms. A first engaging portion is formed on each of the platforms. The pad mechanism further includes a pad component installed in the step fixing structure in a detachable manner. The pad component includes a pad body, and at least one second engaging portion is formed on the pad body for selectively engaging with the corresponding first engaging portion of the plurality of the step platforms, so as to adjust a height of pad body protruding from the step fixing structure. The pad component further includes a sleeve and a constraining portion. An end of the sleeve is connected to the pad body and disposed through the hole. The constraining portion connected to another end of the sleeve. The pad mechanism further includes a resilient component and a constraining component. The resilient component sheathes with the sleeve for driving the sleeve to move inside the hole. The constraining component is installed on an end of the resilient component and connected to the constraining portion, so as to prevent the resilient component from separating from the sleeve.

According to the claimed invention, the height difference is formed between the two adjacent step platforms of the plurality of step platforms, and heights of the two diagonally opposite platforms are identical.

According to the claimed invention, the heights of the platforms between the two diagonally opposite step platforms of the plurality of step platforms are gradually increasing or decreasing.

According to the claimed invention, an inclined plane is formed between the two adjacent step platforms so as to guide the at least one second engaging portion to move between the two adjacent step platforms.

According to the claimed invention, the first engaging portion and the second engaging portion are respectively a recess portion and a protruding portion.

According to the claimed invention, the constraining component includes a hook for engaging with the constraining portion.

According to the claimed invention, an electronic device includes a casing whereon a hole is formed and a pad mechanism installed on the casing. The pad mechanism includes a step fixing structure. The step fixing structure includes a plurality of step platforms surrounding to a hole with a height difference formed between two step platforms of the plurality of step platforms. A first engaging portion is formed on each of the platforms. The pad mechanism further includes a pad component installed in the step fixing structure in a detachable manner. The pad component includes a pad body, and at least one second engaging portion is formed on the pad body for selectively engaging with the corresponding first engaging portion of the plurality of the step platforms, so as to adjust a height of pad body protruding from the step fixing structure. The pad component further includes a sleeve and a constraining portion. An end of the sleeve is connected to the pad body and disposed through the hole. The constraining portion connected to another end of the sleeve. The pad mechanism further includes a resilient component and a constraining component. The resilient component sheathes with the sleeve for driving the sleeve to move inside the hole. The constraining component is installed on an end of the resilient component and connected to the constraining portion, so as to prevent the resilient component from separating from the sleeve.

In summary, the pad mechanism is capable of rotating to adjust the height thereof. The pad mechanism is easy for assembly and maintenance, and it can improve the drawback of the conventional pad mechanism which is unable to adjust the height thereof. In other words, it can solve the drawback of assembly tolerances when assembling the pad component and the electronic device or wearing after the pad component is used for a period so as to cause the electronic device to tilt when it is placed on a supporting surface. Or even when the electronic device is placed on an uneven supporting surface, the electronic device can adjust the height thereof by adjusting the pad mechanism for being placed on the uneven supporting surface stably. Furthermore, the pad mechanism of the present invention is capable of achieving multi-height adjustment according to the user's demands. Accordingly, the height of the electronic device can be boosted not only to prevent the bottom the electronic device from wearing, but also to enlarge a gap between the electronic device and the supporting surface so as to improve convection under the electronic device, such that heat-dissipating efficiency of the electronic device is enhanced. Furthermore, the design of the pad mechanism can adjust a tilting angle of a keyboard of the electronic device, e.g. a portable computer device, and increase a height of a display to reduce loading of the user's shoulders and neck while typing, so as to conform to the ergonomic design, such that the user can operate the electronic device comfortably.

These and other objectives of the present invention will no doubt become obvious to those of ordinary skill in the art after reading the following detailed description of the embodiment that is illustrated in the various figures and drawings.

DETAILED DESCRIPTION

Figure 1:
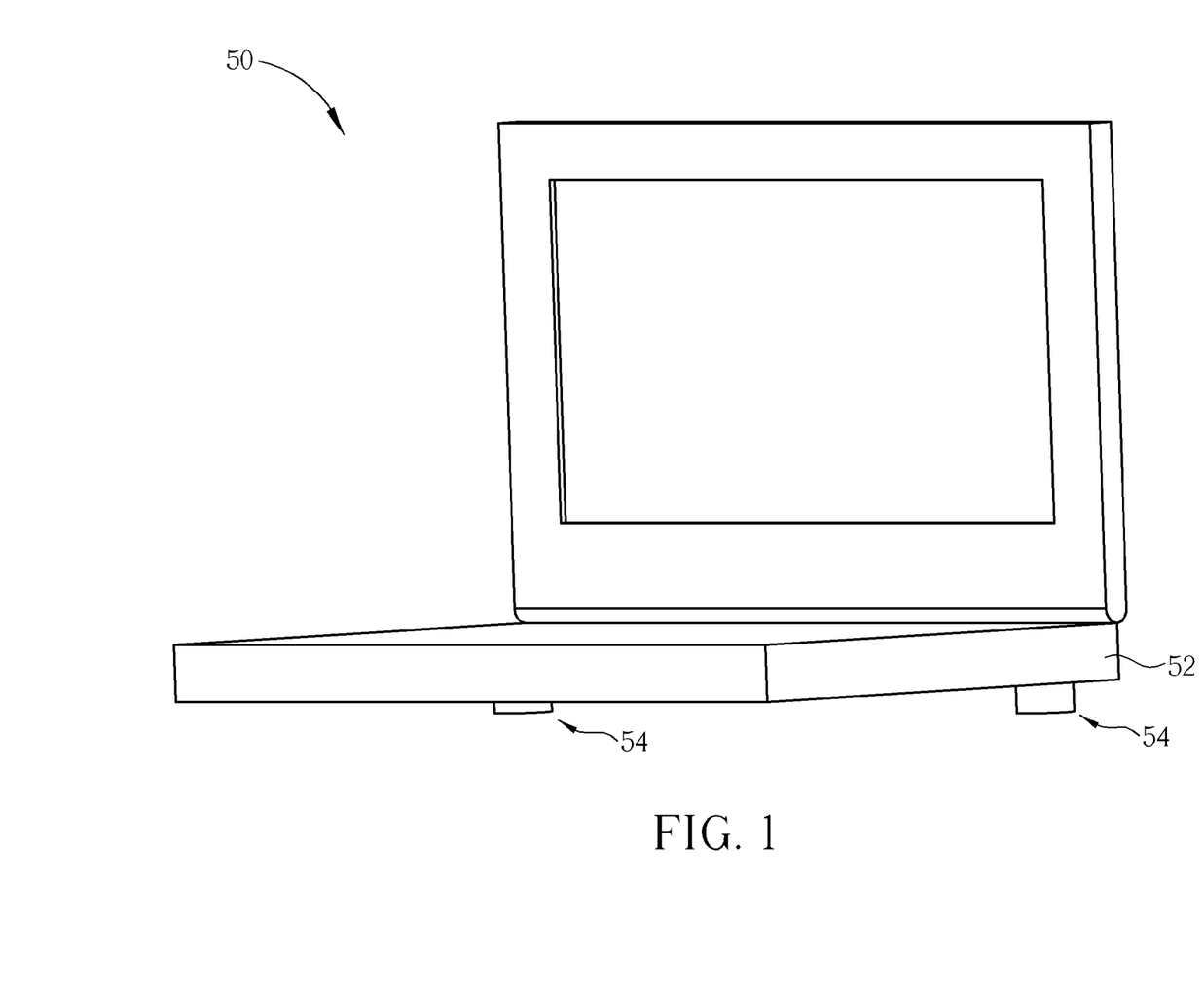
FIG. 1 is a diagram of an electronic device according to an embodiment of the present invention.

Please refer to FIG. 1. FIG. 1 is a diagram of an electronic device 50 according to an embodiment of the present invention. The electronic device 50 can be a portable electronic device, such as a notebook computer and so on. The electronic device 50 includes a casing 52 for covering internal components. The electronic device 50 further includes at least one pad mechanism 54 installed on the casing 52. The pad mechanism 54 is used for boosting the casing 52 of the electronic device 50 so as to not only prevent a bottom of the casing 52 from wearing, but also to enlarge a gap between the casing 52 and a supporting surface. Accordingly, the pad mechanism 54 can improve convection under the electronic device 50, such that heat-dissipating efficiency of the electronic device 50 is enhanced. Furthermore, the pad mechanism 54 can adjust a tilting angle of a keyboard of the electronic device 50, e.g. a portable computer device, and increase a height of a display to reduce loading of the user's shoulders and neck while typing, so as to conform to the ergonomic design, such that the user can operate the electronic device 50 comfortably.

Figure 2:
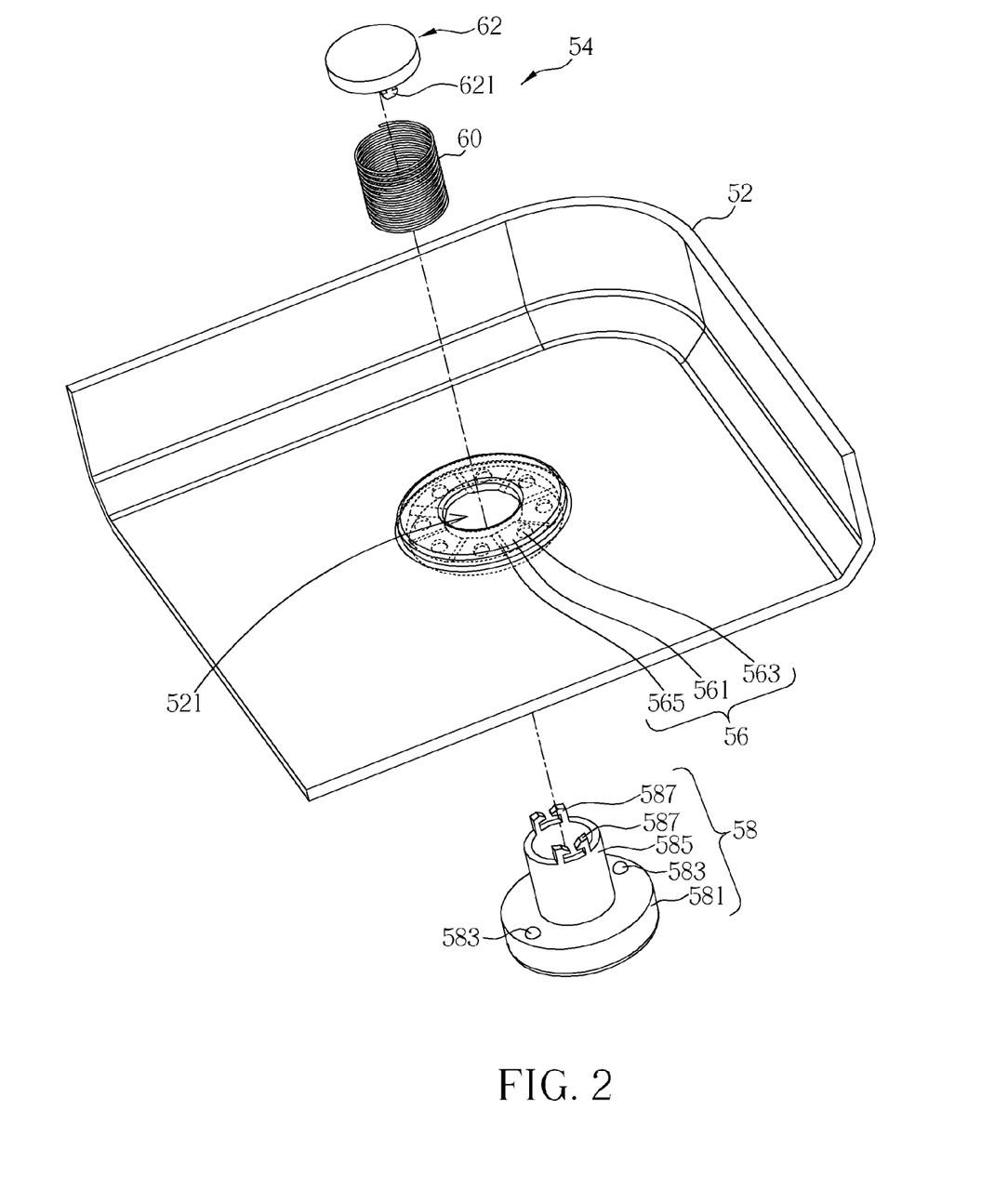
FIG. 2 is an exploded diagram of a pad mechanism according to the embodiment of the present invention.
Figure 3:
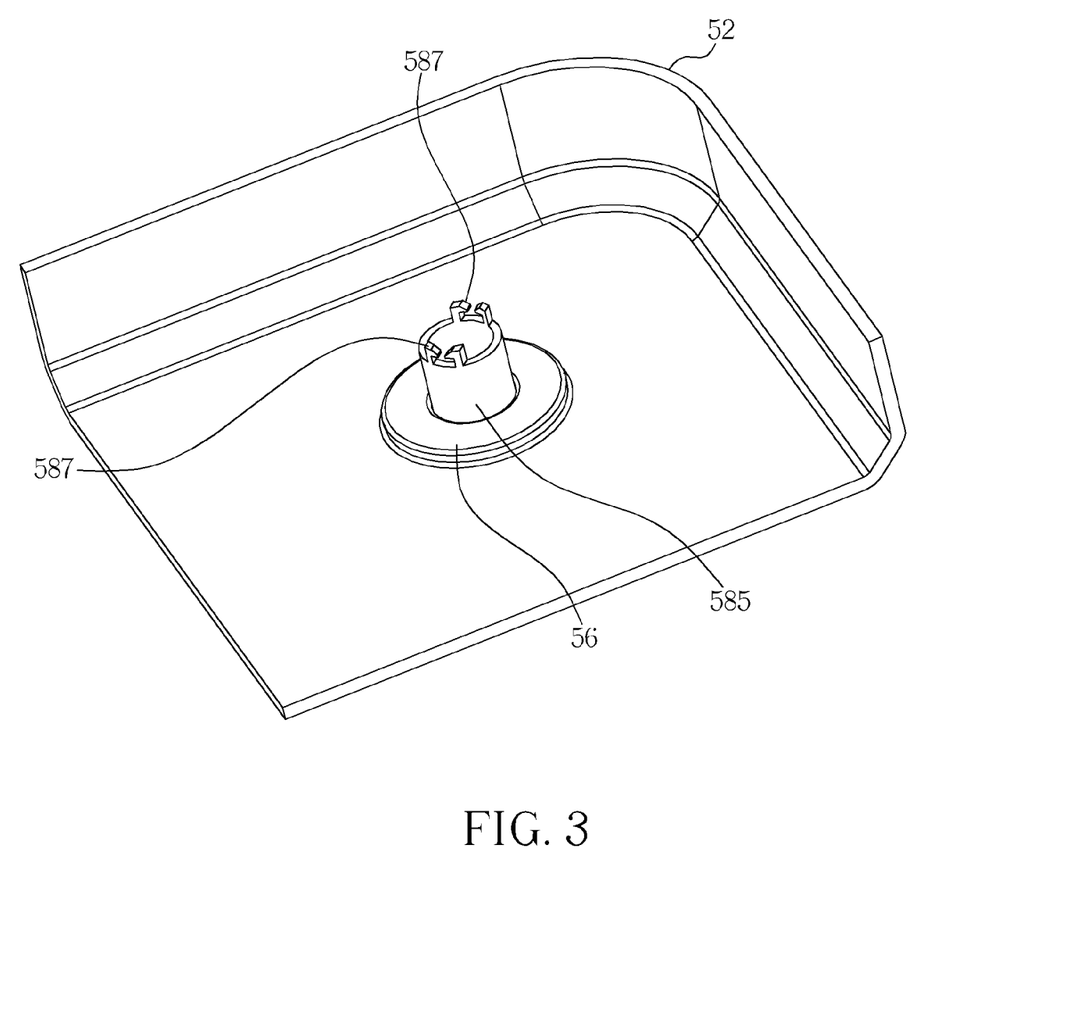
FIG. 3 to FIG. 5 are respectively diagrams illustrating assembly process of the pad mechanism according to the embodiment of the present invention.
Figure 4:
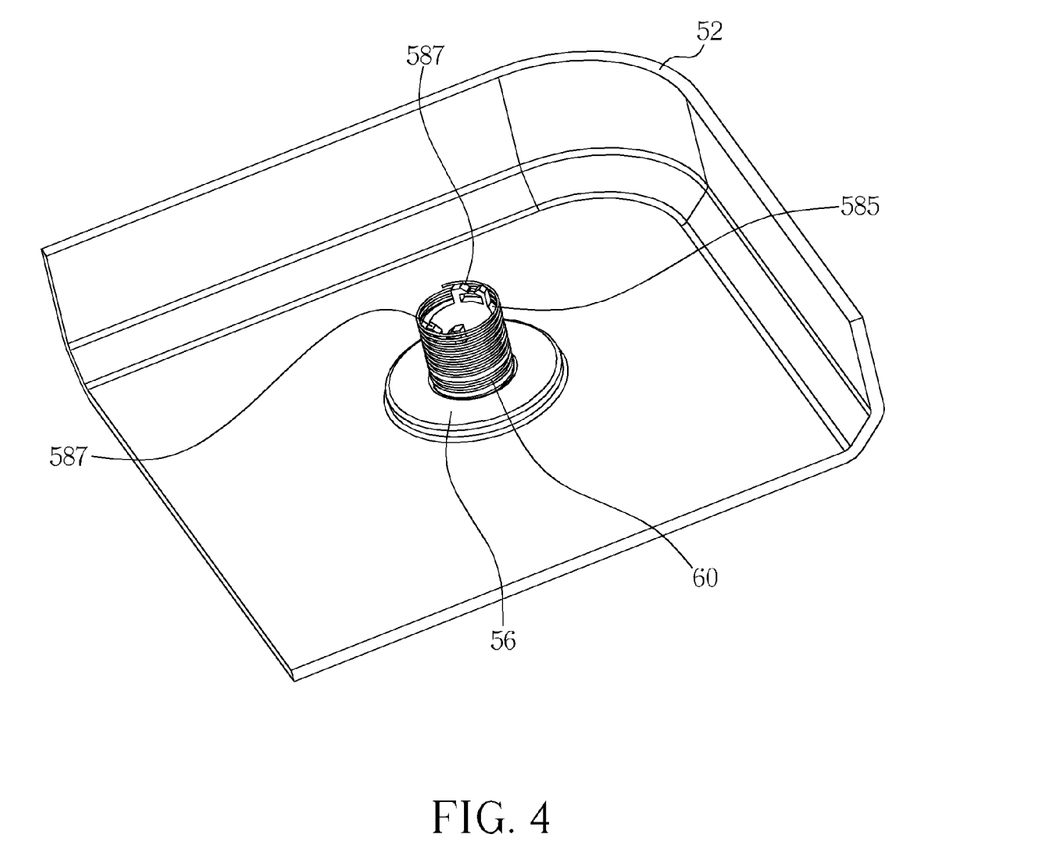
Figure 5:
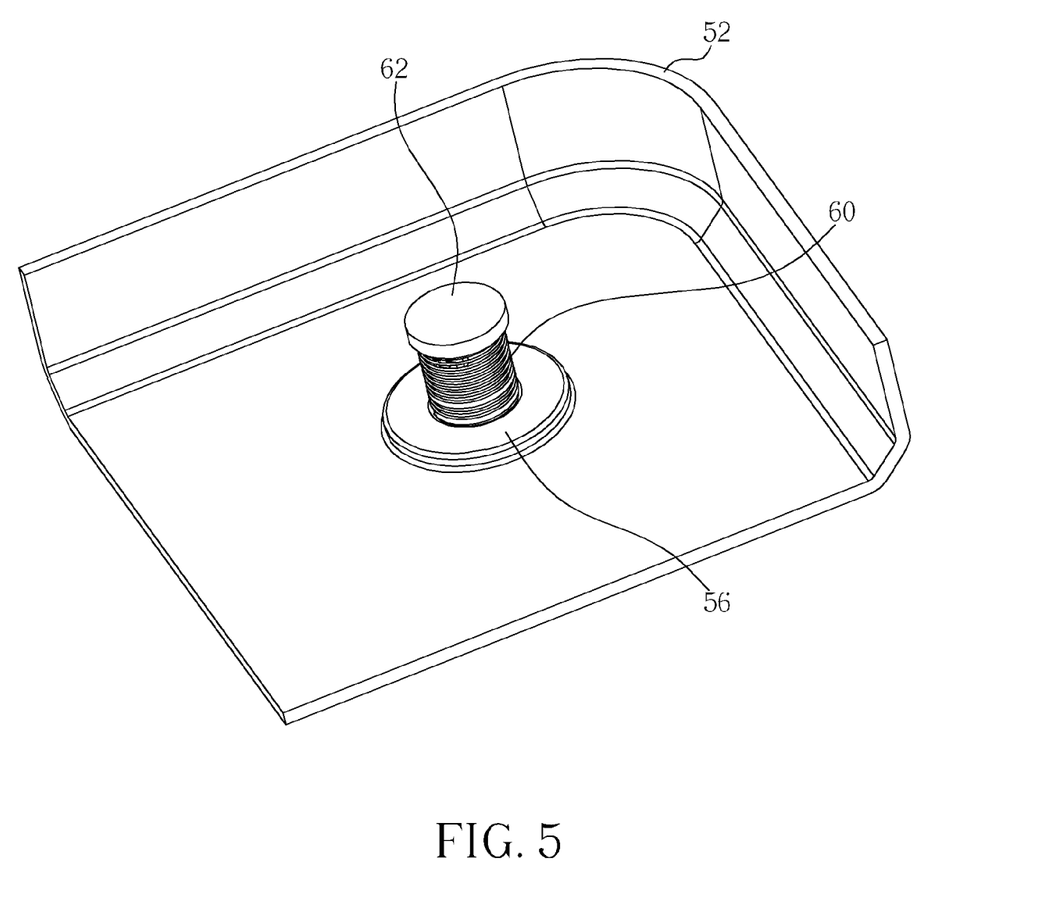
Figure 6:
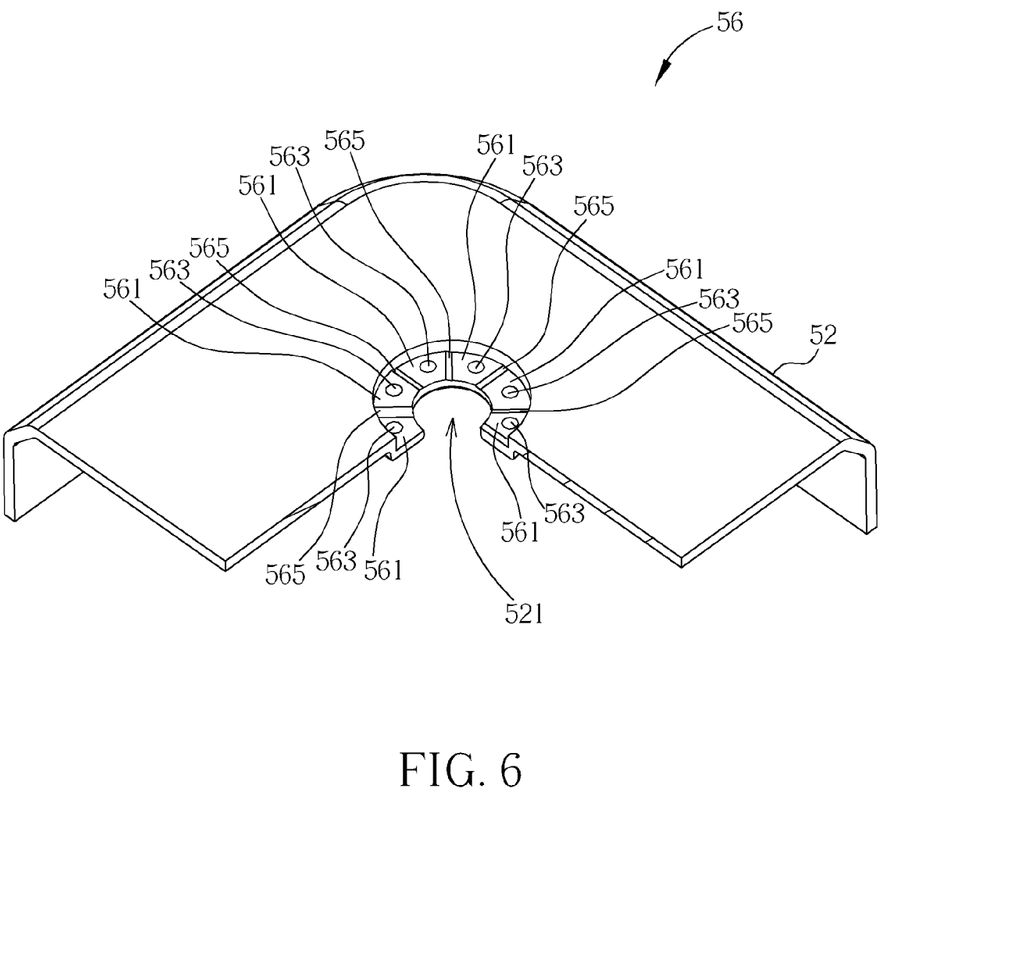
FIG. 6 is a sectional view of a step fixing structure according to the embodiment of the present invention.

Please refer to FIG. 2 to FIG. 5. FIG. 2 is an exploded diagram of the pad mechanism 54 according to the embodiment of the present invention. FIG. 3 to FIG. 5 are respectively diagrams illustrating assembly process of the pad mechanism 54 according to the embodiment of the present invention. The pad mechanism 54 includes a step fixing structure 56 disposed on the casing 52. Please refer to FIG. 6. FIG. 6 is a sectional view of the step fixing structure 56 according to the embodiment of the present invention. The step fixing structure 56 includes a plurality of step platforms 561 surrounding to a hole 521 on the housing 52. A first engaging portion 563 is formed on each of the step platforms 561, and an inclined plane 565 is formed between the two adjacent step platforms 561. The pad mechanism 54 further includes a pad component 58 installed in the step fixing structure 56 in a detachable manner. The pad component 58 further includes a pad body 581, and at least one second engaging portion 583 is formed on the pad body 581. In this embodiment, there are two second engaging portions 583 disposed. Disposal position and amount of the second engaging portion 583 are not limited to those mentioned in this embodiment, and it depends on practical demands. The second engaging portion 583 is used for selectively engaging with the corresponding first engaging portion 563 of the plurality of the step platforms 561, so as to adjust a height of the pad body 581 protruding from the casing 52 and the step fixing structure 56. In this embodiment, the first engaging portion 563 and the second engaging portion 583 can be a recess portion and a protruding portion, respectively, such as a protrusion and a slot. Combination of the first engaging portion 563 and the second engaging portion 583 is not limited to those mentioned in this embodiment, and it depends on practical demands. The pad component 58 further includes a sleeve 585. An end of the sleeve 585 is connected to the pad body 581 and disposed through the hole 521. The pad component 58 further includes at least one constraining portion 587 connected to another end of the sleeve 585. In this embodiment, there are two constraining portions 587 disposed. Disposal position and amount of the constraining portion 587 are not limited to those mentioned in this embodiment, and it depends on practical demands. The constraining portion 587 can be a hook. In addition, the pad body 581, the second engaging portion 583, the sleeve 585 and the constraining portion 587 of the pad component 58 can be integrally formed.

Furthermore, the pad mechanism 54 further includes a resilient component 60 sheathing with the sleeve 585. An end of the resilient component 60 is capable of abutting against the casing 52 for driving the sleeve 585 to move inside the hole 521. In this embodiment, the resilient component 60 can be a spring. The pad mechanism 54 further includes a constraining component 62. The constraining component 62 is installed at another end of the resilient component 60 and connected to the constraining portion 587, so as to prevent the resilient component 60 from separating from the sleeve 585. The constraining component 62 can include at least one hook 621 for engaging with the constraining portion 587. In this embodiment, there are two hooks 621 disposed. Disposal position and amount of the hook 621 is not limited to those mentioned in this embodiment, and it depends on practical demands.

Please refer to FIG. 3 to FIG. 5. When assembling the pad mechanism 54, at first, the sleeve 585 of the pad component 58 can be disposed through the hole 521, as shown in FIG. 3. In the meanwhile, the pad body 581 is located outside the casing 52, and the sleeve 585 and the constraining portion 587 are disposed inside the casing 52. As shown in FIG. 4, the resilient component 60 is sheathed with the sleeve 585 and the end of the resilient component 60 is abutted against the casing 52, so as to provide the pad component 58 with a resilient force. As shown in FIG. 5, the hook 621 of the constraining component 62 hooks the constraining portion 587 of the pad component 58, such that the resilient component 60 can be sheathed with the sleeve 585 stably for preventing the resilient component 60 from separating from the sleeve 585.

Figure 7:
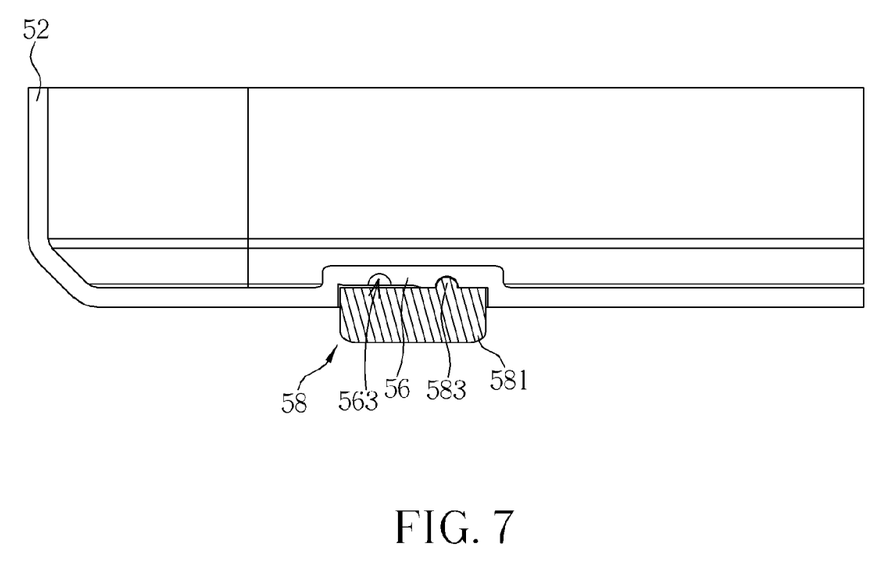
FIG. 7 is a sectional view illustrating a first engaging portion of the step fixing structure 56 and a second engaging portion of a pad component according to the embodiment of the present invention.

When it is desired to lift the electronic device 50 by adjusting the pad mechanism 54, the pad body 581 of the pad component 58 is rotated clockwise or counterclockwise, such that the second engaging portion 583 is separated from the first engaging portion 563 of the step platforms 561. The inclined plane 565 formed between the two adjacent step platforms 561 can guide the second engaging portion 583 to move between the two adjacent step platforms 561 smoothly, so that the second engaging portion 583 can move to the next step platforms 561 and can be engaged with the next first engaging portion 563 by guidance of the inclined plane 565. In the meanwhile, since the constraining component 62 is connected to the constraining portion 587, the constraining component 62 will rotate with the constraining portion 587. When the second engaging portion 583 is moved to different step platforms 561, the constraining component 62 is moved upwards and downwards relatively, such that the resilient component 60 is elastically deformed. For example, the constraining component 62 is moved downwards such that the resilient component 60 is elastically compressed when the second engaging portion 583 is lowered to the next first engaging portion 563 along the step fixing structure 56. On the other hand, when the second engaging portion 583 is lifted to other first engaging portion 563 along the step fixing structure 56, the resilient component 60 will provide the constraining component 62 with a resilient force, such that the constraining component 62 drives the pad component 58 to lift. Accordingly, the second engaging portion 583 can successfully be engaged with the next first engaging portion 563. Please refer to FIG. 6 and FIG. 7. FIG. 7 is a sectional view illustrating the first engaging portion 563 of the step fixing structure 56 and the second engaging portion 583 of the pad component 58 according to the embodiment of the present invention. A height difference is formed between the two step platforms 561. For example, the height difference can be formed between the two adjacent step platforms 561, and heights of the two diagonally opposite step platforms 561 are identical. In this embodiment, the heights of the step platforms 561 between the two diagonally opposite step platforms 561 can be gradually increasing or decreasing. In other words, the heights of the step platforms 561 arranged in the clockwise or in the counterclockwise direction can be gradually increasing or decreasing relative to the specific step platform 561 as a reference. When the specific step platform 561 is countered in the clockwise direction or in the counterclockwise direction to the diagonally opposite step platforms 561, the heights of the specific step platform 561 and diagonally opposite step platforms 561 are identical to each other. In other words, the heights of the two diagonally opposite step platforms 561 can be the same. In such a manner, the user can gradually adjust the height of the pad body 581 protruding from the casing 52 and the step fixing structure 56 by rotating the pad body 581 of the pad component 58, so as to adjust the gap between the casing 52 and the supporting surface which supports the electronic device 50.

Compared with the prior art, the pad mechanism is capable of rotating to adjust the height thereof. The pad mechanism is easy for assembly and maintenance, and it can improve the drawback of the conventional pad mechanism which is unable to adjust the height thereof. In other words, it can solve the drawback of assembly tolerances when assembling the pad component and the electronic device or wearing after the pad component is used for a period so as to cause the electronic device to tilt when it is placed on a supporting surface. Or even when the electronic device is placed on an uneven supporting surface, the electronic device can adjust the height thereof by adjusting the pad mechanism for being placed on the uneven supporting surface stably. Furthermore, the pad mechanism of the present invention is capable of achieving multi-height adjustment according to the user's demands. Accordingly, the height of the electronic device can be boosted not only to prevent the bottom the electronic device from wearing, but also to enlarge a gap between the electronic device and the supporting surface so as to improve convection under the electronic device, such that heat-dissipating efficiency of the electronic device is enhanced. Furthermore, the design of the pad mechanism can adjust a tilting angle of a keyboard of the electronic device, e.g. a portable computer device, and increase a height of a display to reduce loading of the user's shoulders and neck while typing, so as to conform to the ergonomic design, such that the user can operate the electronic device comfortably.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pad mechanism comprising:
   a step fixing structure comprising a plurality of step platforms surrounding to a hole, a height difference being formed between two step platforms of the plurality of step platforms, a first engaging portion being formed on each of the platforms;
   a pad component installed in the step fixing structure in a detachable manner, the pad component comprising:
      a pad body, whereon at least one second engaging portion is formed for selectively engaging with the corresponding first engaging portion of the plurality of the step platforms so as to adjust a height of the pad body protruding from the step fixing structure;
      a sleeve with an end connected to the pad body and disposed through the hole; and
      a constraining portion connected to another end of the sleeve;
   a resilient component sheathing with the sleeve for driving the sleeve to move inside the hole; and
   a constraining component installed on an end of the resilient component and connected to the constraining portion so as to prevent the resilient component from separating from the sleeve.

2. The pad mechanism of claim 1, wherein the height difference is formed between the two adjacent step platforms of the plurality of step platforms, and heights of the two diagonally opposite step platforms are identical.

3. The pad mechanism of claim 1, wherein the heights of the step platforms between the two diagonally opposite step platforms of the plurality of step platforms are gradually increasing or decreasing.

4. The pad mechanism of claim 2, wherein the heights of the step platforms between the two diagonally opposite step platforms of the plurality of step platforms are gradually increasing or decreasing.

5. The pad mechanism of claim 1, wherein an inclined plane is formed between the two adjacent step platforms so as to guide the at least one second engaging portion to move between the two adjacent step platforms.

6. The pad mechanism of claim 2, wherein an inclined plane is formed between the two adjacent step platforms so as to guide the at least one second engaging portion to move between the two adjacent step platforms.

7. The pad mechanism of claim 1, wherein the first engaging portion and the second engaging portion are respectively a recess portion and a protruding portion.

8. The pad mechanism of claim 1, wherein the constraining component comprises a hook for engaging with the constraining portion.

9. An electronic device comprising:
   a casing whereon a hole is formed; and
   a pad mechanism installed on the casing, comprising:
      a step fixing structure comprising a plurality of step platforms surrounding to a hole, a height difference being formed between two step platforms of the plurality of step platforms, a first engaging portion being formed on each of the platforms;
      a pad component installed in the step fixing structure in a detachable manner, the pad component comprising:
         a pad body, whereon at least one second engaging portion is formed for selectively engaging with the corresponding first engaging portion of the plurality of the step platforms so as to adjust a height of the pad body protruding from the casing;
         a sleeve with an end connected to the pad body and disposed through the hole; and
         a constraining portion connected to another end of the sleeve;
      a resilient component sheathing with the sleeve for driving the sleeve to move inside the hole; and
      a constraining component installed on an end of the resilient component and connected to the constraining portion so as to prevent the resilient component from separating from the sleeve.

10. The electronic device of claim 9, wherein the height difference is formed between the two adjacent step platforms of the plurality of step platforms, and heights of the two diagonally opposite step platforms are identical.

11. The electronic device of claim 9, wherein the heights of the step platforms between the two diagonally opposite step platforms of the plurality of step platforms are gradually increasing or decreasing.

12. The electronic device of claim 10, wherein the heights of the step platforms between the two diagonally opposite step platforms of the plurality of step platforms are gradually increasing or decreasing.

13. The electronic device of claim 9, wherein an inclined plane is formed between the two adjacent step platforms so as to guide the at least one second engaging portion to move between the two adjacent step platforms.

14. The electronic device of claim 10, wherein an inclined plane is formed between the two adjacent step platforms so as to guide the at least one second engaging portion to move between the two adjacent step platforms.

15. The electronic device of claim 9, wherein the first engaging portion and the second engaging portion are respectively a recess portion and a protruding portion.

16. The electronic device of claim 9, wherein the constraining component comprises a hook for engaging with the constraining portion.

\* \* \* \* \*